US010695692B2

(12) United States Patent
Wikfors

(10) Patent No.: US 10,695,692 B2
(45) Date of Patent: Jun. 30, 2020

(54) DEVICE AND METHOD OF A SUPERCRITICAL FLUID SYSTEM FOR DETECTING ANALYTES USING A LOW PRESSURE DETECTOR

(71) Applicant: AGILENT TECHNOLOGIES, INC., Loveland, CO (US)

(72) Inventor: Edwin E. Wikfors, Landenberg, PA (US)

(73) Assignee: Agilent Technologies, Inc., Santa Clara, CA (US)

( * ) Notice: Subject to any disclaimer, the term of this patent is extended or adjusted under 35 U.S.C. 154(b) by 917 days.

(21) Appl. No.: 14/750,437

(22) Filed: Jun. 25, 2015

(65) Prior Publication Data

US 2016/0375376 A1 Dec. 29, 2016

(51) Int. Cl.
*B01D 15/16* (2006.01)
*B01D 15/40* (2006.01)
*G01N 30/32* (2006.01)
*G01N 30/84* (2006.01)

(52) U.S. Cl.
CPC ........... *B01D 15/163* (2013.01); *B01D 15/40* (2013.01); *G01N 30/32* (2013.01); *G01N 30/84* (2013.01)

(58) Field of Classification Search
CPC ....... B01D 15/40; B01D 15/16; B01D 15/163
USPC ........................................................ 210/137
See application file for complete search history.

(56) References Cited

U.S. PATENT DOCUMENTS 6,289,914 B1 * 9/2001 Tommasi ............... G01N 30/10
137/15.18

7,575,723 B2 * 8/2009 Nichols ................... H01J 49/04
422/540
7,905,133 B2 * 3/2011 Chordia ................ G01N 30/84
73/61.56
9,731,219 B2 8/2017 Wang et al.
2015/0021265 A1 1/2015 Jackson et al.

FOREIGN PATENT DOCUMENTS

WO 2014189738 A2 11/2014
WO WO-2014189738 A2 * 11/2014 ............. G01N 30/30

OTHER PUBLICATIONS

WO 2014189738, Murphy James, Nov. 2014.*
UK Search Report dated Jan. 19, 2017 from related UK Application No. GB1610772.4.

* cited by examiner

*Primary Examiner* — Robert Clemente
*Assistant Examiner* — Akash K Varma

(57) ABSTRACT

A device is provided in a supercritical fluid system, which uses a mobile phase output by a separation device, the mobile phase volumetrically expanding as it decompresses. The device includes a passive splitter and a shuttle valve. The passive splitter is configured to receive the mobile phase and to split the mobile phase into a primary flow stream and a split flow stream, where the primary flow stream is directed to a pressure maintenance device. The passive splitter is further configured to reduce pressure of the split flow stream, causing volumetric expansion of the split flow stream. The shuttle valve is configured to insert volumetric aliquots of the volumetrically expanded split flow stream into a dilution flow stream to provide a diluted split flow stream, and to direct the diluted split flow stream to a low pressure detector.

20 Claims, 7 Drawing Sheets

DEVICE AND METHOD OF A SUPERCRITICAL FLUID SYSTEM FOR DETECTING ANALYTES USING A LOW PRESSURE DETECTOR

BACKGROUND

The various embodiments described herein are directed to low pressure detection of analytes from among sample constituents of a sample in supercritical fluid systems. Examples of supercritical fluid systems include supercritical fluid chromatography (SFC) systems and supercritical fluid extraction (SFE) systems.

Generally, supercritical fluid systems separate (or extract) the sample constituents using a separation unit, such as a chromatographic column. For example, a sample containing various sample constituents, such as chemical compounds and the like, dissolved in a solvent solution may be injected into a fluid stream (mobile phase) with an injection valve, where the mobile phase typically comprises one or more solvents. The sample-containing mobile phase flows through a separation unit, which selectively retains the sample constituents from the sample. In an SFC system, the separation unit comprises a chromatographic column, in which the sample constituents from the sample experience a differential retention with the chromatographic column's stationary phase, e.g., using packing material or sorbent within the chromatographic column, and the relative elution strength of the mobile phase. In an SFE system, the separation unit comprises a chamber or vessel to contain the bulk sample in the presence of an extraction solvent (mobile phase) which extracts the various sample constituents from the sample. The composition of the mobile phase, pressure, and temperature may be varied with time resulting in selective extraction (separation) of sample constituents analogous to chromatographic separations using a column.

The separated sample constituents (or analytes) may then be directed to detectors for detection, collection and/or analysis, where each of the analytes emerges from the separation unit at a different time corresponding to the respective differential retention of that analyte within the separation unit. Detection over time results in "peaks" respectively corresponding to the analytes of the sample, where the magnitude of each peak correlates to the amount of the corresponding analytes in the sample. The detectors include a low pressure detector, such as a mass spectrometer, which receives a relatively small portion of the mobile phase at a relatively low pressure (e.g., atmospheric pressure). The detectors may also include one or more high pressure detectors that receive the bulk of the primary flow stream of the mobile phase, and identify portions of the mobile phase containing the analyte(s) of interest from among the separated sample constituents based on peak detection. These identified portions may be collected by fraction collectors.

As mentioned above, the mobile phase typically comprises a mixture of solvents provided by corresponding pumping systems. In chromatographic systems, the solvents include at least a strong solvent and a weak solvent referring to the solvents relative elution strength in relation to each other and to the stationary phase of the separation unit being used. The strong solvent favors a partitioning of the sample components into the mobile phase, thus lessening retention, or providing faster transiting of the separation unit. The weak solvent favors partitioning of the sample components on the separation unit's stationary phase thus increasing retention, and may serve to moderate the effects of the strong solvent. Attempts are made to balance the mobile phase composition or ratio between the strong and weak solvents in order to provide an acceptable compromise between speed of operation and quality of the analytical results.

SFC systems with packed columns typically use an organic solvent, such as methanol, as the strong solvent and highly compressed dense carbon dioxide ($CO_2$) as the weak solvent. Notably, while the name of the technique, SFC, implies use of fluids in a supercritical state, the actual use includes fluids that while dense, are not necessarily supercritical. Preparative SFC systems typically exist for the express purpose of sample purification. In preparative SFC, the injected sample concentrations often exceed 10 mg/mL. Such high concentrations of sample typically exceed allowable input ranges of many mass spectrometers which operate at or below the 1 µg/ml range. In preparative SFC, the timeliness of the signal from a low pressure detector is important to ensure timely triggering of fraction collectors.

SFE is a process of separating one or more components (extractants) from another (matrix) using fluids similar to a SFC mobile phase as the extracting solvents. Extraction is usually from a solid matrix, but may also be from liquids. SFE may be used as a sample preparation step for analytical purposes, or on a larger scale, to either strip unwanted material from a product or collect a desired product. Again, $CO_2$ is the most used supercritical fluid, sometimes modified by co-solvents such as ethanol or methanol. The properties of a supercritical fluid can be altered by varying the pressure and temperature, allowing selective extraction. A typical SFE system, for example, includes a pumping system for the $CO_2$ and any co-solvents, a pressure cell to contain the sample, the ability to maintain pressure in the system, and a collecting vessel or vessels. The liquid may be pumped to a heating zone, where its temperature may be raised to true supercritical conditions. It then passes into the extraction vessel, where it rapidly diffuses into the solid matrix and dissolves the material to be extracted. The dissolved material is swept from the extraction cell into a separator at lower pressure, and the extracted materials are removed.

In all supercritical fluid systems, the analytes may be detected, as well as analyzed, by a low pressure detector, such as a mass spectrometer. However, the mobile phase output by the separation unit and containing the separated sample constituents is at a pressure and concentration higher than acceptable by most low pressure detectors. Accordingly, there is a need for a timely, efficient, flow splitter providing a controllable means for directing a very small portion of the mobile phase exiting the separation unit to a low pressure detector, without interrupting flow of the portion of the mobile phase remaining at high pressure. There is also a need for the ability to adjust (e.g., in real-time) the low pressure mobile portion of the mobile phase.

BRIEF DESCRIPTION OF THE DRAWINGS

The representative embodiments are best understood from the following detailed description when read with the accompanying drawing figures. Wherever applicable and practical, like reference numerals refer to like elements.

DETAILED DESCRIPTION

Figure 1:
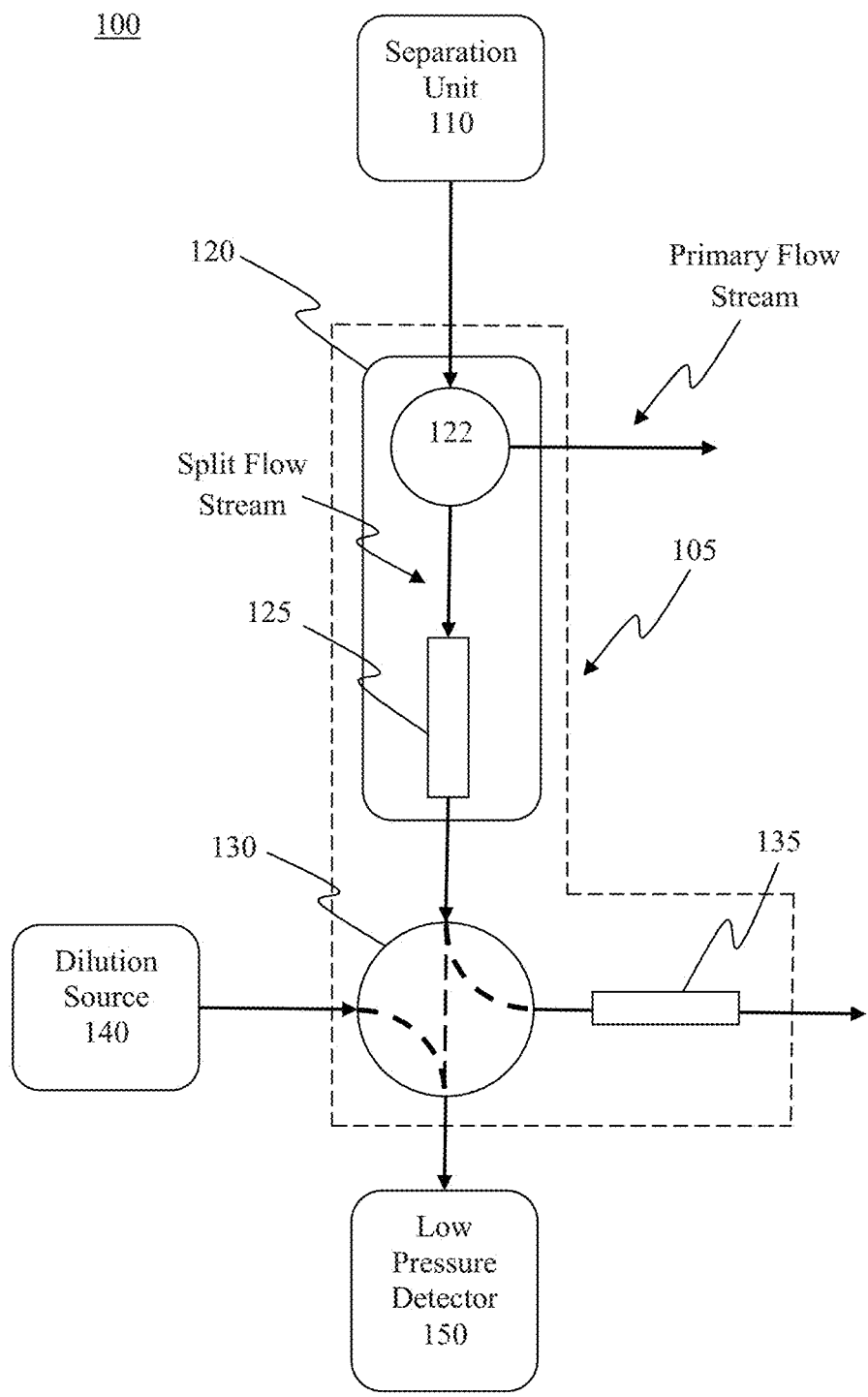
FIG. 1 is a simplified block diagram of a device in a supercritical fluid system, according to a representative embodiment.

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

Generally, it is understood that as used in the specification and appended claims, the terms "a", "an" and "the" include both singular and plural referents, unless the context clearly dictates otherwise. Thus, for example, "a device" includes one device and plural devices.

As used in the specification and appended claims, and in addition to their ordinary meanings, the terms "substantial" or "substantially" mean to within acceptable limits or degree. For example, "substantially cancelled" means that one skilled in the art would consider the cancellation to be acceptable. As a further example, "substantially removed" means that one skilled in the art would consider the removal to be acceptable.

As used in the specification and the appended claims and in addition to its ordinary meaning, the term "approximately" means to within an acceptable limit or amount to one having ordinary skill in the art. For example, "approximately the same" means that one of ordinary skill in the art would consider the items being compared to be the same.

Various embodiments are provided for a flow splitter which may have a dynamically adjustable split ratio, offering a range in split ratios from very high split ratios (e.g., greater than about 10,000:1) to very low split ratios (e.g., less than about 500:1). The dynamic adjustment may result from frequency of operation of a shuttle valve (e.g., shuttle valve 130, discussed below) and/or from adjustment of a waste regulator (e.g., waste flow stream regulator 135). The flow splitter provides a small time delay for the mobile phase to reach the low pressure detector (e.g., mass spectrometer), enabling use of the detection results in real-time fraction collection triggering and/or decisions.

Therefore, according to various embodiments a flow splitter device in a supercritical fluid system and a method of using the flow splitter device are provided, where a mobile phase output by a separation device in the supercritical fluid system volumetrically expands as it decompresses. The flow splitter device generally combines elements of passive splitters, restrictors, and a shuttle valve. Utilizing the volumetric expansion of the fluid exiting the passive splitter for volumetric metering into a dilution stream by a shuttle valve provides an additional factor in the split ratio without yielding to multiple cascades of serialized splitters to achieve a similar result.

According to a representative embodiment, a flow splitter device is provided in a supercritical fluid system, using a mobile phase output by a separation device, the mobile phase volumetrically expanding as it decompresses. The device includes a passive splitter configured to receive the mobile phase and to split the mobile phase into a primary flow stream and a split flow stream and to reduce pressure of the split flow stream, causing volumetric expansion of the split flow stream, where the primary flow stream is directed to a pressure maintenance device. The device further includes a shuttle valve configured to insert volumetric aliquots of the volumetrically expanded split flow stream into a dilution flow stream to provide a diluted split flow stream, and to direct the diluted split flow stream to a low pressure detector. The passive splitter may include a splitter tee configured to split the mobile phase into the primary flow stream and the split flow stream, and a splitter restrictor configured to reduce the pressure of the split flow stream, causing volumetric expansion of the split flow stream. The shuttle valve also directs remaining portions of the volumetrically expanded split flow stream, not inserted as aliquots into the dilution flow stream, to waste via a waste flow stream regulator, which regulator sets a pressure density experienced by the shuttle valve.

FIG. 1 is a simplified block diagram of a device in a supercritical fluid system, according to a representative embodiment.

Referring to FIG. 1, supercritical fluid system 100 includes a separation unit 110, a low pressure detector 150, and a flow splitter 105 for reducing the pressure of the high pressure mobile phase received from the separation unit 110 and providing a sample of greatly reduced concentration (high split ratio) to the low pressure detector 150. The pressure of the high pressure mobile phase is maintained by high pressure maintenance device (not shown) further described below with reference to FIGS. 2-4. This pressure is exemplarily maintained above 90 bar, and may be as high as 400 bar, though operating over a greater range, above and below these values, would be apparent in view of the present disclosure. The flow rate of the high pressure mobile phase exiting the separation unit may be variable and within a range of about 2.0 ml/min. to about 200 ml/min., for example. These limits may vary to provide unique benefits for any particular situation or to meet application specific requirements of various implementations, as would be apparent to one skilled in the art.

In the depicted embodiment, the flow splitter 105 includes a passive splitter 120, a shuttle valve 130, and a waste flow stream regulator 135. The passive splitter 120 includes a splitter tee 122 and a splitter restrictor 125. The waste flow stream regulator 135 establishes the pressure of the split flow stream at shuttle valve 130. The pressure difference between the splitter tee 122 and waste flow stream regulator 135 defines the pressure reduction experienced by the splitter restrictor 125. The reduction in pressure through the splitter restrictor 125 causes a volumetric expansion of the mobile phase as the gaseous portion expands at the lowered pressure of the outlet. In other words, the mobile phase volumetrically expands and reduces density as it decompresses. For example, when $CO_2$ or other gaseous solvent is present in the mobile phase, it may expand (e.g., by as much as about 500:1) as the mobile phase decompresses. The volumetric expansion enables volumetric sampling of the split flow stream at both a reduced pressure as well as a reduced density. The reduced pressure allows the use of a shuttle valve, such as the shuttle valve 130, typically regarded as a low pressure device, to sample the split flow stream at selectable frequency and volumetric sampling size. The reduced density is manifested by a lower concentration of sample constituent in each volumetric aliquot sampled by the shuttle valve 130. The combination of passive splitting, volumetric expansion, volumetric sampling of an expanded flow, and subsequent dilution provide highly variable split ratios for use in sensitive low pressure detectors such as a mass spectrometer.

The passive splitter 120 receives the mobile phase (or high pressure flow stream) from the separation unit 110. The mobile phase includes the sample constituents (or analytes) that have been separated from the sample by the separation unit 110 for subsequent detection. The splitter tee 122 of the passive splitter 120 is configured to split the mobile phase into a primary flow stream and a split flow stream. The primary flow stream may be directed to at least a pressure maintenance device, discussed below, and the split flow stream is directed toward the low pressure detector 150. In various embodiments, the passive splitter 120, including the splitter tee 122 and splitter restrictor 125, is governed by known principles, such as the Darcy-Weisbach relation and/or Poiseuille relation in the case of laminar flow. Abiding by such principles, the amount of restriction, and the pressure drop across the splitter restrictor 125 determine the magnitude of flow in the split flow stream. By varying the amount of total restriction in the split flow path, or the specific drop in pressure experienced by the splitter restrictor 125, the amount of flow through the split flow stream can be adjusted. In various embodiments, the splitter restrictor 125 may be a narrow restrictor tube, a frit restrictor, or one or more of each. An example of a narrow restrictor tube may have dimensions of about 50 μm by about 2.0 m, although other dimensions may be incorporated without departing from the scope of the present teachings.

The shuttle valve 130, which can function as a type of active splitter, is configured to sample aliquots of the volumetrically expanded split flow stream and insert them into a separately provided dilution flow stream. The dilution flow further reduces the average concentration of the sample constituents sampled by the shuttle valve resulting in a diluted split flow stream. The diluted split flow stream containing the aliquots of the volumetrically expanded split flow stream is directed to the low pressure detector 150. The diluted split flow stream is provided by a dilution source 140, such as a dilution pump, for example, although other techniques for delivering the diluted split flow stream may be provided without departing from the scope of the present teachings. The flow rate of the dilution flow stream may be in a range of about 0.3 ml/min. to about 1.0 ml/min., or generally meeting the flow requirements of the specific low pressure detector being used. The dilution flow stream rate may vary to provide unique benefits for any particular situation or to meet application specific requirements of various implementations, as would be apparent to one skilled in the art. For example, when the low pressure detector 150 encompasses a mass spectrometer, the fluid provided by dilution source 140 may include a buffer to aid in ionization of sample constituents.

Aliquots are discrete volumes of the volumetrically expanded split flow stream, systematically metered into the dilution flow stream, typically (but not necessarily) at set intervals, by the shuttle valve 130. An example of a shuttle valve is described by NICHOLS et al. in U.S. Pat. No. 7,575,723 (issued Aug. 18, 2009), the entire contents of which are hereby incorporated by reference. Also, the shuttle valve 130 may be implemented, for example, as a mass rate attenuator (MRA®) device, available from the Rheodyne division of Idex Health and Sciences. Generally, use of an active splitter or shuttle valve, such as a mass rate attenuator (MRA®) device, allows instantaneous adjustment of a split ratio within a run. For example, the volume of the aliquot may be changed in real-time on the MRA® device. Aliquot volume (size) provides another dynamic adjustment. This allows discrimination of high concentration peaks (which would otherwise subject mass spectrometers and other low pressure detectors to overload and tailing) from subsequent trace peaks requiring a lower split ratio for detection. In the various embodiments, the incorporation of active splitters in a supercritical flow stream becomes practical even though conventional shuttle valves are low pressure devices that cannot withstand use in a high pressure supercritical fluid system flow stream.

The shuttle valve 130 is further configured to direct remaining portions (those portions not inserted as aliquots into the dilution flow stream) of the volumetrically expanded split flow stream to waste as a waste flow stream via a waste flow stream regulator 135. The waste flow stream regulator 135 sets a pressure density experienced by the shuttle valve 130. This means the pressure experienced at the outlet of split restrictor 125 is set by the pressure set by the waste flow stream regulator 135; thus, the amount of flow through and the volumetric expansion occurring within splitter restrictor 125 may be adjusted by changes in the pressure setting of waste flow stream regulator 135. In an embodiment, the waste flow stream regulator 135 is dynamically adjustable, enabling (real-time) adjustments in the pressure density experienced by the shuttle valve 130, as discussed below with reference to FIG. 4. The waste flow stream regulator 135 may be a passive restrictor, a back pressure regulator (BPR), or a combination of one or more of each, for example, as discussed below. When the waste flow stream regulator 135 is a passive restrictor, it may be implemented as a narrow restrictor tube, a frit restrictor, or one or more of each, for example. An example of a narrow restrictor tube as the waste flow stream regulator 135 may have dimensions of about 0.12 mm by about 400 mm, although other dimensions may be incorporated without departing from the scope of the present teachings.

Figure 2:
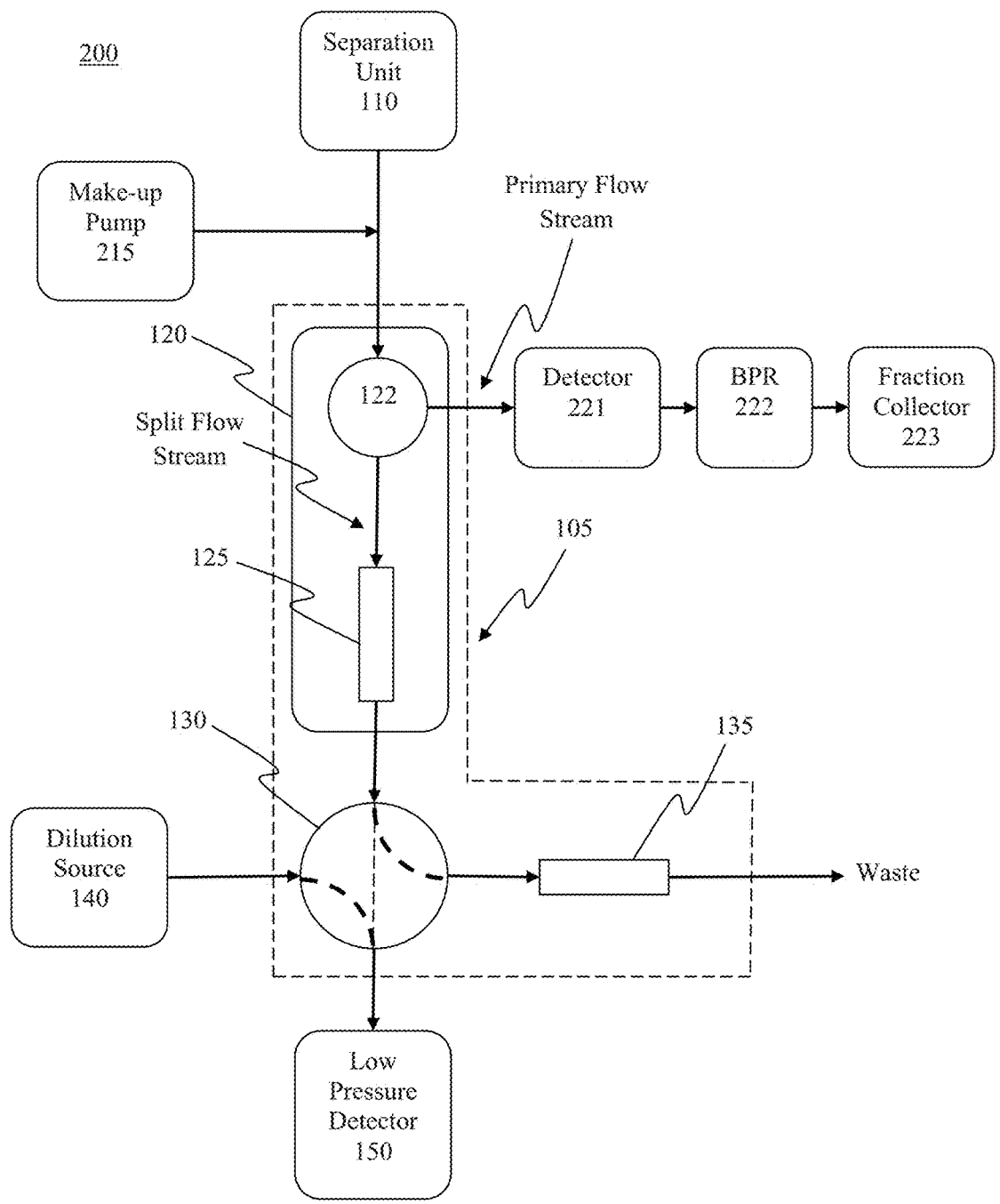
FIG. 2 is a simplified block diagram of a device in a supercritical fluid system, according to a representative embodiment.

FIG. 2 is a simplified block diagram of a device in a supercritical fluid system, according to another representative embodiment.

Referring to FIG. 2, supercritical fluid system 200 includes the separation unit 110, the low pressure detector 150, and the flow splitter 105 for reducing the pressure and concentration of analytes in the split flow stream, as discussed above with reference to FIG. 1. The flow splitter 105 includes the splitter tee 122, the splitter restrictor 125, the shuttle valve 130 and the waste flow stream regulator 135.

In the depicted embodiment, the supercritical fluid system 200 further includes a makeup pump 215 configured to provide makeup flow using a makeup fluid from a reservoir (not shown). That is, the makeup pump 215 may pump additional solvent from a reservoir (not shown) into the high pressure mobile phase exiting the separation unit 110, prior to the mobile phase entering the splitter tee 122. For example, the makeup fluid of the makeup flow may be comprised of an organic liquid, such as methanol, possibly entrained with additives to enhance detector operation. The flow rate of the makeup flow may exemplarily be in a range of about 0.5 ml/min. to about 3.0 ml/min., although the makeup flow rate may vary significantly to provide unique benefits for any particular situation or to meet application specific requirements of various implementations, as would be apparent to one skilled in the art.

The supercritical fluid system 200 also includes a high pressure detector 221, a pressure maintenance device 222, and a fraction collector 223. The high pressure detector 221 may be a non-destructive detector, such as a UV diode array detector or chiral based detector using techniques such as circular dichroism, for example. The high pressure detector 221 is configured to detect analytes in the primary flow stream and to provide signals representing the analytes to a controller or processing unit (not shown). It is understood that high pressure detector 221 and fraction collector 223 are optional, and may be omitted. Although one high pressure detector 221 is shown, it is understood that multiple high pressure detectors 221 may be included, e.g., for substantially simultaneous detection, without departing from the scope of the present teachings.

Generally, the controller or processing unit may be implemented by a computer processor (e.g., of a personal computer (PC) or dedicated workstation), application specific integrated circuits (ASICs), field-programmable gate arrays (FPGAs), or combinations thereof, using software, firmware, hard-wired logic circuits, or combinations thereof. A computer processor, in particular, may be constructed of any combination of hardware, firmware or software architectures, and may include memory (e.g., volatile and/or non-volatile memory) for storing executable software/firmware executable code that allows it to perform the various functions. In an embodiment, the computer processor may comprise a central processing unit (CPU), for example, executing an operating system.

After leaving the high pressure detector 221, the primary flow stream passes through the pressure maintenance device 222, which may be a BPR, for example. The pressure maintenance device 222 keeps the upstream pressure above a pressure where the mobile phase is compatible with the high pressure detector 221. The upstream pressure maintained by the pressure maintenance device 222 may operate in a representative range of about 90 bar to about 400 bar, for example. The mobile phase containing sample constituents exiting the high pressure detector 221 is collected by the fraction collector 223. The fraction collector 223 is informed of the presence of a separated analyte, detected by one or more of the low pressure detector 150 and/or detector 221, e.g., through the controller or processing unit mentioned above. Again, although one fraction collector 223 is shown, it is understood that multiple fraction collectors 223 may be included, e.g., for collection of detected analytes, without departing from the scope of the present teachings. The selection of splitter restrictor 125 and settings of shuttle valve 130, the waste flow stream regulator 135, and the dilution source 140 not only affect the split ratio of the system, they also affect time for an analyte to transit through the flow splitter 105 to the low pressure detector 150. When low pressure detector 150 is used for triggering the fraction collector 223, this transit time should be minimized by maintaining high flow rates through and a low volume in the splitter restrictor 125 as well as a high flow rate from the dilution source 140. Delay may be added to the system with the selection of more voluminous tubing exiting the splitter tee 122 entering the detector 221, as needed to compensate for the transit time or processing delays associated with the flow splitter 105 and the low pressure detector 150.

Figure 3:
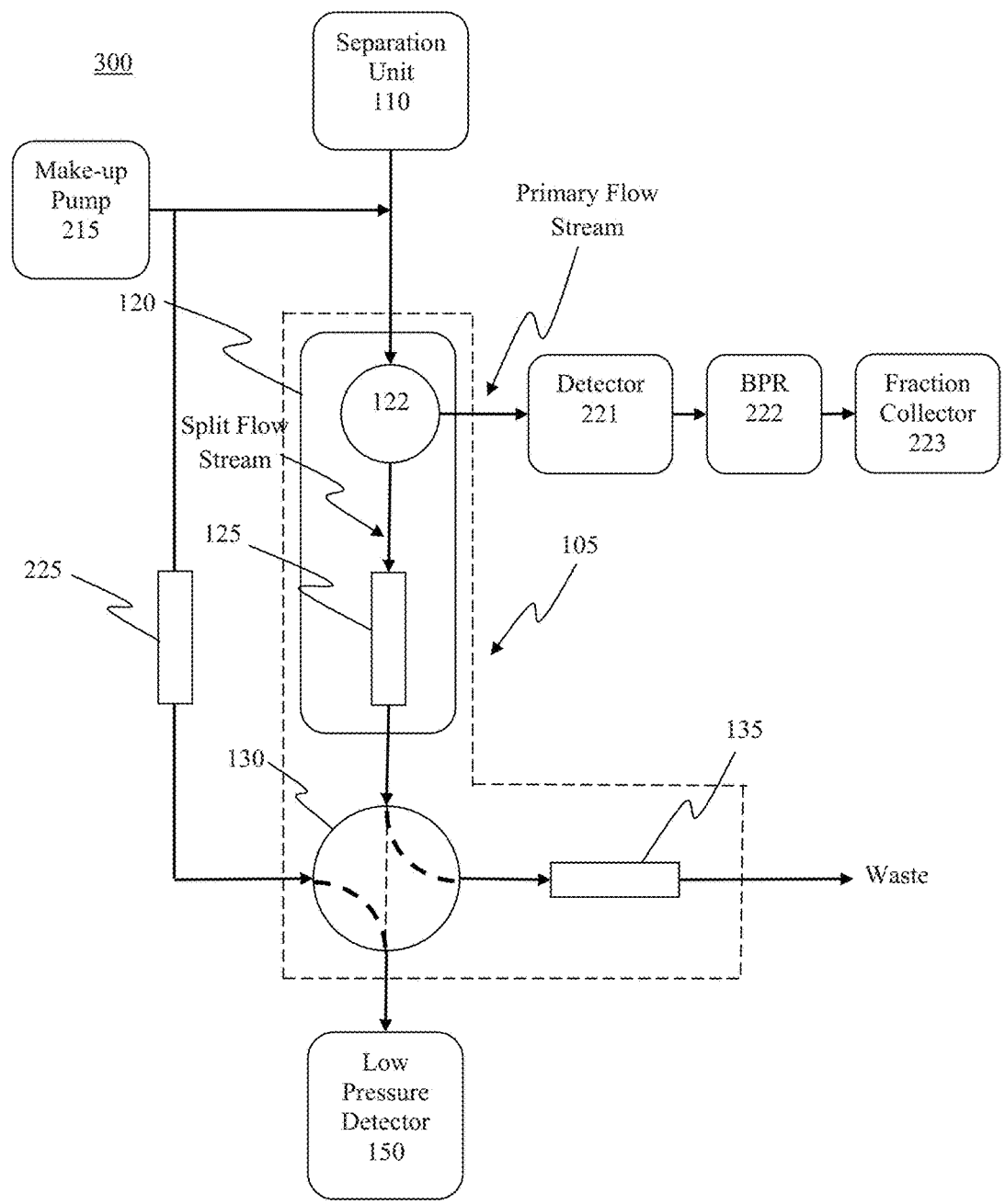
FIG. 3 is a simplified block diagram of a device in a supercritical fluid system, according to a representative embodiment.

FIG. 3 is a simplified block diagram of a device in a supercritical fluid system, according to another representative embodiment.

Referring to FIG. 3, supercritical fluid system 300 includes the separation unit 110, the low pressure detector 150, and the flow splitter 105 for reducing the pressure and concentration of analytes in the split flow stream, as discussed above with reference to FIG. 1. The flow splitter 105 includes the splitter tee 122, the splitter restrictor 125, the shuttle valve 130 and the waste flow stream regulator 135. In the depicted embodiment, the supercritical fluid system 300 further includes the makeup pump 215, as well as the high pressure detector 221, the pressure maintenance device 222, and the fraction collector 223, discussed above with reference to FIG. 2.

However, in the supercritical fluid system 300, the dilution flow stream is not provided by a separate dilution source 140, such as a dilution pump configured to pump the dilution flow stream from a reservoir. Rather, the dilution flow stream originates as a portion of the makeup flow, provided by the makeup pump 215, which passes through a passive restrictor 225. In various embodiments, the passive restrictor 225 may be a narrow restrictor tube, a frit restrictor, or one or more of each, for example. The shuttle valve 130 inserts aliquots of the volumetrically expanded split flow stream into the dilution flow stream tapped off of the makeup flow from the makeup pump 215 to provide a diluted split flow stream, which is directed to the low pressure detector, the same as described above with reference to FIG. 1. Generally, when the pressure maintenance device 222 is operated at a constant pressure (generally a normal usage in preparative SFC systems), the pressure across the passive restrictor 225 is also constant. This constant pressure across the passive restrictor 225 results in a constant dilution flow without an additional pump.

Figure 4:
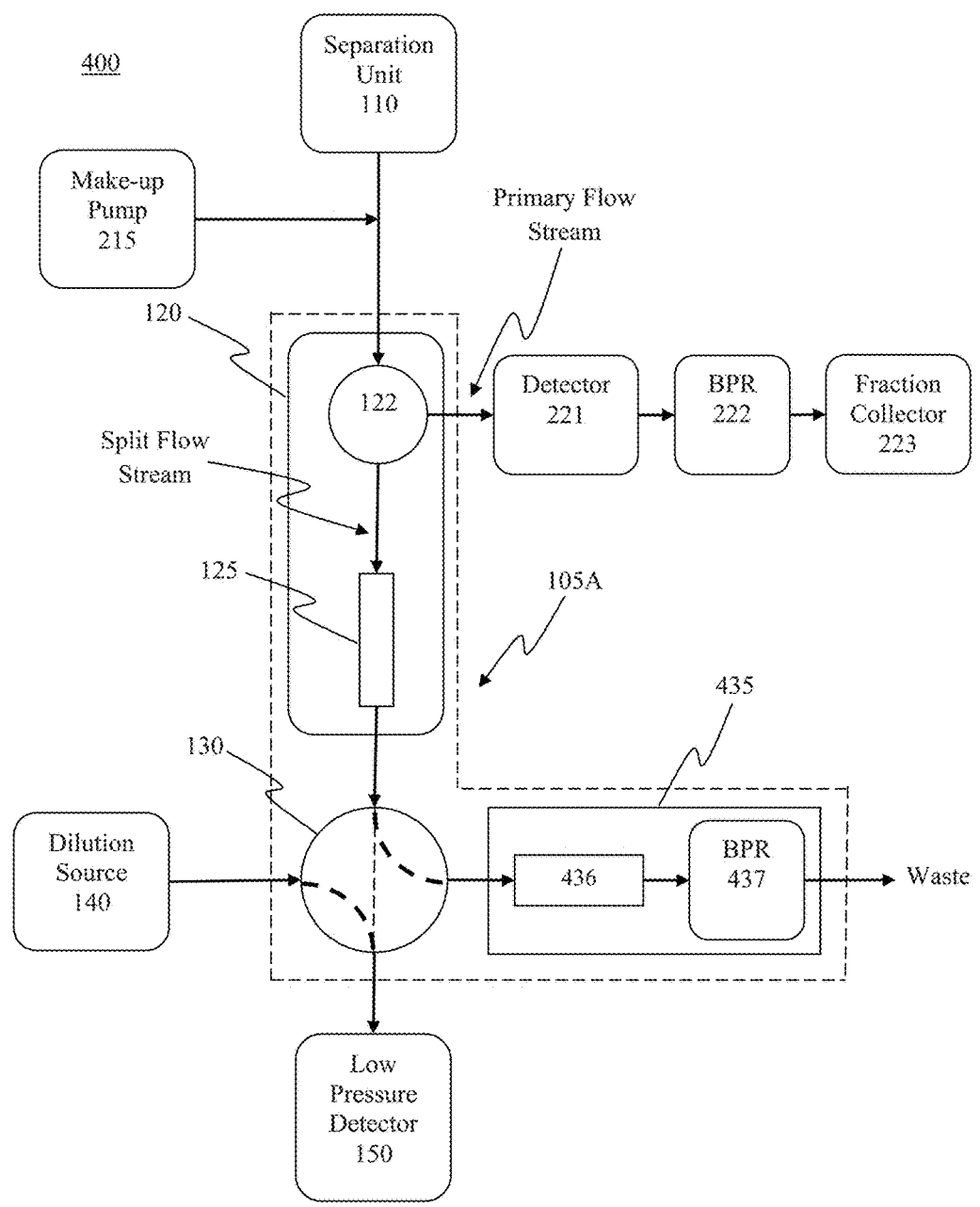
FIG. 4 is a simplified block diagram of a device in a supercritical fluid system, according to a representative embodiment.

FIG. 4 is a simplified block diagram of a device in a supercritical fluid system, according to another representative embodiment.

Referring to FIG. 4, supercritical fluid system 400 includes the separation unit 110, the low pressure detector 150, and a modified flow splitter 105A for reducing the pressure and concentration of analytes in the split flow stream, similar to the flow splitter discussed above with reference to FIG. 1. The modified flow splitter 105A includes the splitter tee 122, the splitter restrictor 125, and the shuttle valve 130. In addition, the modified flow splitter 105A includes a dynamically adjustable waste flow stream regulator 435, which enables dynamic adjustment (e.g., in real-time) of the pressure density experienced by the shuttle valve 130. That is, the adjustable waste flow stream regulator 435 provides pressure adjustment (and thus density adjustment) on the aliquots of the volumetrically expanded split flow stream transferred via the shuttle valve 130. As shown in the example of FIG. 4, the waste flow stream regulator 435 may include a waste restrictor 436 and an adjustable BPR 437 connected in series. In this configuration, the adjustable BPR 437 enables the adjustment of pressure density experienced by shuttle valve 130. The adjustable pressure also affects the overall flow through the split restrictor 125.

In the depicted embodiment, the supercritical fluid system 400 further includes the makeup pump 215 and the dilution source 140, as well as the high pressure detector 221, the pressure maintenance device 222, and the fraction collector 223, discussed above with reference to FIGS. 1 and 3. Of course, in alternative configurations, the modified flow splitter 105A may be incorporated into the supercritical fluid system 300 (which does not include the dilution source 140, but rather provides the dilution flow stream from the makeup pump 215 via the passive restrictor 225, discussed above with reference to FIG. 3.

Figure 5:
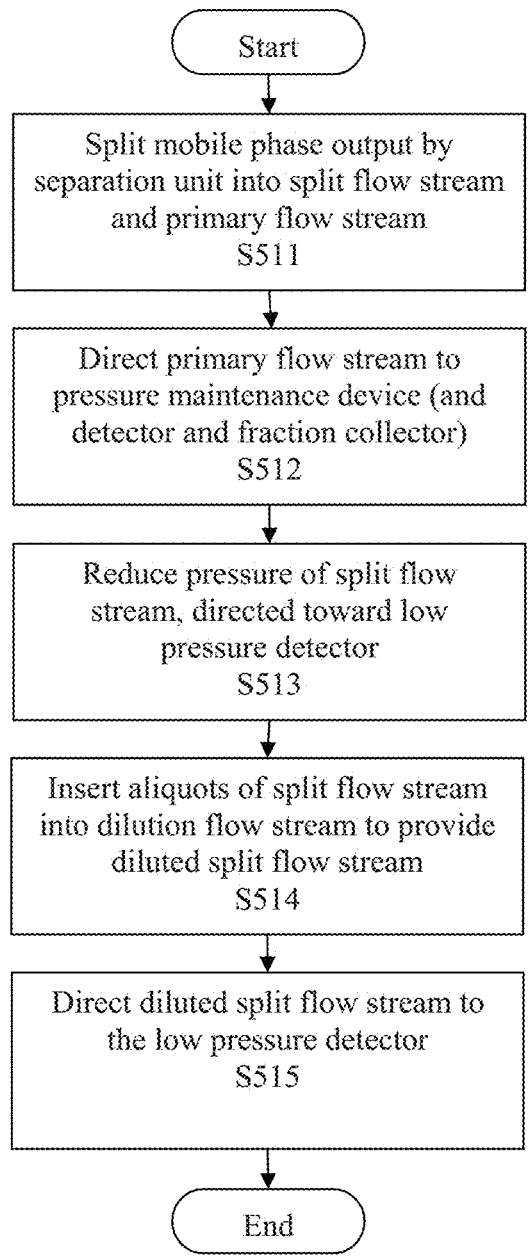
FIG. 5 is a flow diagram illustrating a method of providing a mobile phase to a low pressure detector in a supercritical fluid system, according to a representative embodiment.

FIG. 5 is a flow diagram of a method of supplying a sample from a mobile phase of a supercritical fluid system to a low pressure detector (e.g., low pressure detector 150), which may include a mass spectrometer, for example, according to a representative embodiment.

Referring FIG. 5, the method includes splitting the mobile phase output by a separation unit (e.g., separation unit 110) of the supercritical fluid system into a split flow stream and a primary flow stream at block S511. The splitting may be accomplished using a passive splitter (e.g., splitter tee 122 and splitter restrictor 125) positioned downstream for the separation unit.

In block S512, the primary flow stream is optionally directed to a pressure maintenance device (e.g., pressure maintenance device 222). The primary flow stream may also be optionally directed to one or more detectors (e.g., high pressure detector(s) 221) and one or more fraction collectors (e.g., fraction collector(s) 223) for collecting a portion of the primary flow stream having an analyte of interest, as respectively identified by the one or more detectors. When used, the detector(s) and fraction collector(s) may be connected in series with the pressure maintenance device, as shown FIG. 2, for example. As mentioned above, the pressure maintenance device keeps the upstream pressure above a pressure where the mobile phase is compatible with the one or more high pressure detectors.

In block S513, the pressure of the split flow stream, which is directed toward the low pressure detector, is reduced, causing volumetric expansion of the split flow stream. Reducing the pressure of the split flow stream may include directing the split flow stream through a splitter restrictor (e.g., splitter restrictor 125).

Aliquots of the volumetrically expanded split flow stream are inserted into a dilution flow stream through a shuttle valve (e.g., shuttle valve 130) in block S514 to provide a diluted split flow stream. The diluted split flow stream is directed to the low pressure detector in block S515. In various embodiments, the method may further include directing remaining portions of the volumetrically expanded split flow stream (that is, those portions of the volumetrically expanded split flow stream not inserted as aliquots into the dilution flow stream) to waste via a waste flow stream regulator (e.g., waste flow stream regulator 135, 435). As discussed above, the waste flow stream regulator may be adjustable to enable adjustments in the pressure density experienced by the shuttle valve. The adjustments to the pressure density may be made in real-time. Also, pressure set by the waste flow stream regulator may be adjusted, e.g., using an adjustable flow stream regulator (e.g., adjustable flow stream regulator 435 and/or BPR 437), in order to adjust a pressure density experienced by the shuttle valve. In an embodiment, the pressure may be adjusted in real-time.

Figure 6A:
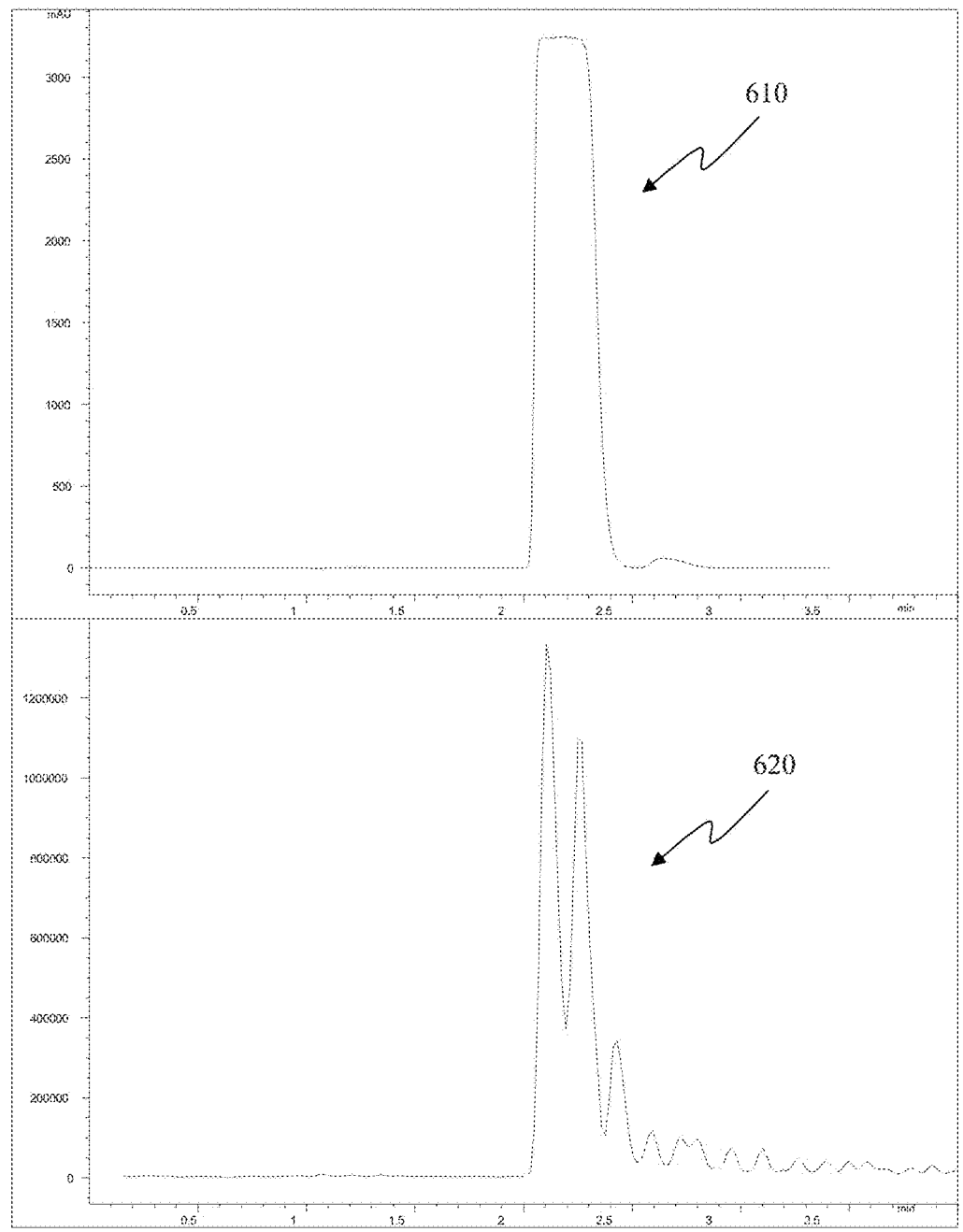
FIG. 6A shows traces depicting an ultraviolet (UV) signal and a mass spectrometer signal over time for a supercritical fluid system using only a passive splitter.
Figure 6B:
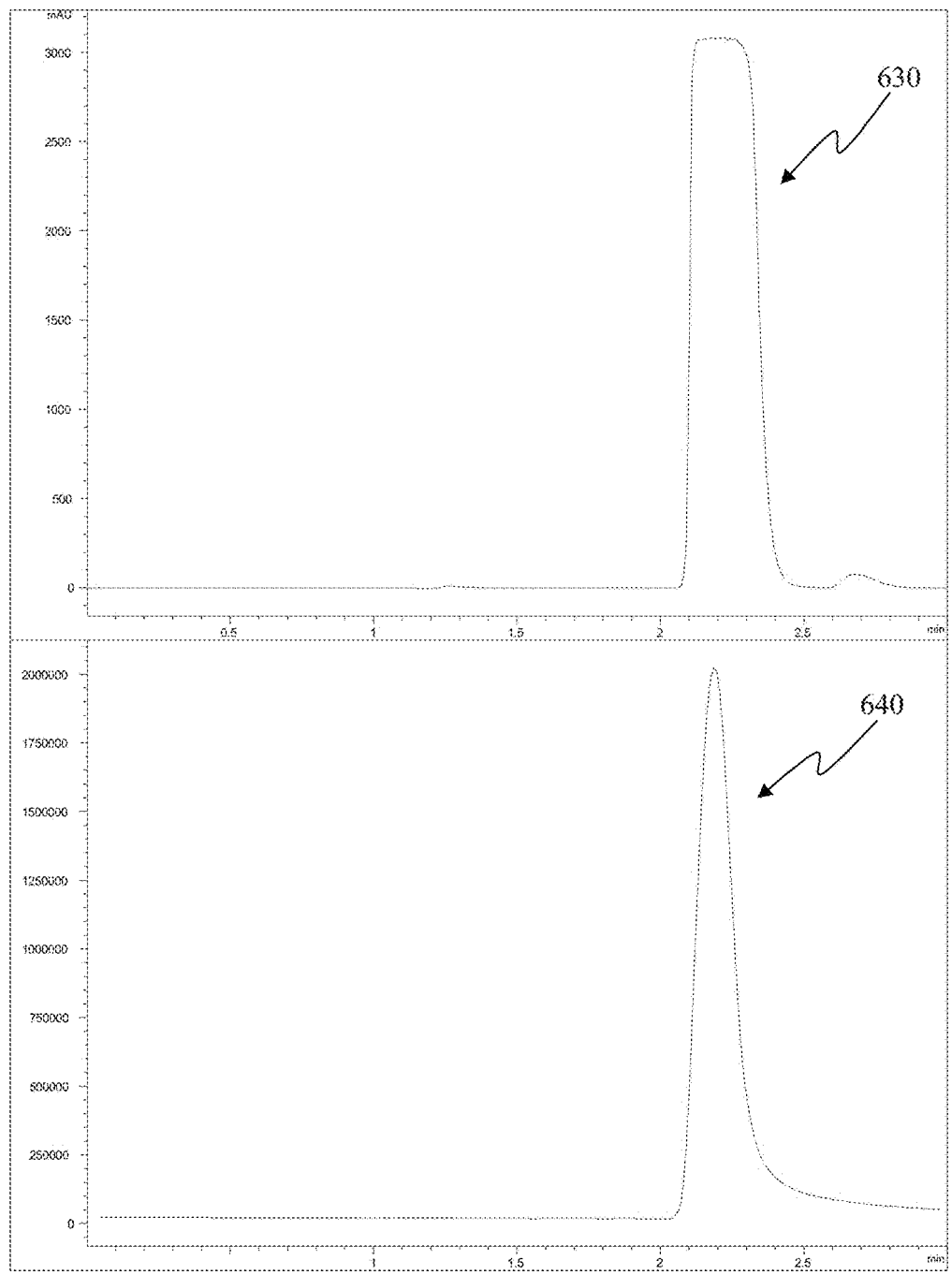
FIG. 6B shows traces depicting a UV signal and mass spectrometer signals for a supercritical fluid system, according to a representative embodiment.

FIG. 6A shows traces depicting ultraviolet (UV) signals 610 (top) and mass spectrometer signals 620 (bottom) displayed by a mass spectrometer (e.g., low pressure detector 150) over time using only a passive splitter (e.g., splitter tee 122 and splitter restrictor 125). FIG. 6B shows traces depicting UV signals 630 (top) and mass spectrometer signals 640 (bottom) displayed by a mass spectrometer (e.g., low pressure detector 150) over time using the flow splitter 105 (including the shuttle valve 130, etc.), according to various embodiments described herein.

In the examples shown in FIGS. 6A and 6B, a highly concentrated solution of theophylline (180 µl at 1 mg/ml sample concentration) was injected onto a 6.2×250 mm 5 µm silica chromatographic column (e.g., separation unit 110). The flow rate was about 5 ml/min., and the mobile phase exiting the chromatographic column was about 20 percent methanol. The pressure maintenance device 222 was set to about 100 bar (e.g., the BPR setting). In FIG. 6A, representing a conventional SFC system (not utilizing a flow splitter of the various embodiments), the mass spectrometer signal 620 from the low pressure detector 150 shows overload, suppression, and tailing that prevent use of the mass spectrometer signal from the low pressure detector 150 in fraction collection. In FIG. 6B, representing a SFC system 200 as depicted in FIG. 2, for example, the mass spectrometer signal 640 from the low pressure detector 150 is properly formed and representative of, as well as time aligned with, the UV signal 630 from the high pressure detector 221. Properly representative signals, such as signals 640, allow timely interface with the fraction collector 223 triggering logic for identification of target peaks for collection utilizing the low pressure detector 150.

One of ordinary skill in the art appreciates that many variations that are in accordance with the present teachings are possible and remain within the scope of the appended claims. These and other variations would become clear to one of ordinary skill in the art after inspection of the specification, drawings and claims herein. The invention therefore is not to be restricted except within the spirit and scope of the appended claims.

What is claimed:

1. A flow splitter device in a supercritical fluid system, using a mobile phase output by a separation device, the mobile phase volumetrically expanding as it decompresses, the device comprising:
   a passive splitter comprising a splitter tee and a splitter tee restrictor, the splitter tee configured to receive the mobile phase and to split the mobile phase into a primary flow stream and a split flow stream and, the splitter tee restrictor configured to reduce pressure of the split flow stream, causing volumetric expansion of the split flow stream containing an expanded gaseous $CO_2$ portion, wherein the primary flow stream is directed to a pressure maintenance device; and
   a shuttle valve configured to insert volumetric aliquots of the volumetrically expanded split flow stream into a dilution flow stream to provide a diluted split flow stream, and to direct the diluted split flow stream to a low pressure detector, and direct the remaining portions of the volumetrically expanded split flow stream away from the low pressure detector.

2. The device of claim 1, wherein the shuttle valve is further configured to direct remaining portions of the volumetrically expanded split flow stream, not inserted as volumetric aliquots into the dilution flow stream, to waste via a waste flow stream regulator, the waste flow stream regulator setting a pressure density experienced by the shuttle valve.

3. The device of claim 2, wherein the waste flow stream regulator is dynamically adjustable, enabling adjustments in the pressure density experienced by the shuttle valve.

4. The device of claim 2, wherein the waste flow regulator comprises at least one of a waste restrictor or a back pressure regulator.

5. The device of claim 1, wherein the primary flow stream is directed to one or more high pressure detectors and a fraction collector for collecting a portion of the primary flow stream, as identified by at least one of the one or more high pressure detectors or the low pressure detector.

6. The device of claim 1, wherein the passive splitter is configured to operate at a pressure of at least 90 bar.

7. The device of claim 1, wherein the splitter restrictor comprises at least one of a narrow restrictor tube or a frit restrictor.

8. The device of claim 1, further comprising:
a makeup pump is configured to provide solvent to the mobile phase prior to the passive splitter, wherein the dilution flow stream comprises a portion of the solvent provided by the makeup pump via a passive restrictor.

9. The device of claim 1, wherein the dilution flow stream is provided by a dilution pump.

10. The device of claim 1, wherein the pressure maintenance device comprises a back pressure regulator (BPR).

11. The device of claim 1, wherein the low pressure detector comprises a mass spectrometer.

12. The device of claim 1, wherein the shuttle valve comprises a mass rate attenuator.

13. A method of supplying a sample from a mobile phase output by a separation device of a supercritical fluid system to a low pressure detector, the method comprising:
splitting the mobile phase output by the separation device into a split flow stream and a primary flow stream, by directing the mobile phase output through a splitter tee;
reducing pressure of the split flow stream by directing the split flow stream through a splitter restrictor, causing volumetric expansion of the split flow stream containing an expanded gaseous $CO_2$ portion;
inserting volumetric aliquots of the volumetrically expanded split flow stream into a dilution flow stream to provide a diluted split flow stream;
directing the diluted split flow stream to the low pressure detector; and
directing remaining portions of the volumetrically expanded split flow stream away from the low pressure detector.

14. The method of claim 13, further comprising:
directing the primary flow stream to a pressure maintenance device, a high pressure detector and a fraction collector for collecting a portion of the primary flow stream having an analyte of interest, as identified by at least one of the high pressure detector and the low pressure detector.

15. The method of claim 13, further comprising:
directing remaining portions of the volumetrically expanded split flow stream, not inserted as volumetric aliquots into the dilution flow stream, to waste via a waste flow stream regulator; and
adjusting a pressure set by the waste flow stream regulator in order to adjust a pressure density experienced by the shuttle valve.

16. A chromatographic system, comprising:
a chromatographic column having a stationary phase for separating analytes in a high pressure mobile phase; and
the flow splitter device of claim 1 for reducing pressure of the high pressure mobile phase, wherein the passive splitter comprises:
a splitter tee configured to receive the mobile phase with separated analytes from the chromatographic column and to split the mobile phase into the primary flow stream and the split flow stream; and
a splitter restrictor configured to reduce pressure of the split flow stream, causing volumetric expansion of the split flow stream.

17. The chromatographic system of claim 16, wherein the flow splitter further comprises:
a waste flow stream regulator in a split waste flow path positioned between the shuttle valve and waste, the waste flow stream regulator being configured to set a pressure density experienced by the shuttle valve,
wherein the shuttle valve directs remaining portions of the volumetrically expanded split flow stream to the waste via the split waste flow path.

18. The device of claim 1, comprising a configuration selected from the group consisting of:
the passive splitter is configured to split the mobile phase and reduce the pressure of the split flow stream without diluting the split flow stream, and to direct the undiluted, volumetrically expanded split flow stream to the shuttle valve;
the splitter tee is the only splitter tee between the separation device and the low pressure detector; and
both of the foregoing.

19. The method of claim 13, comprising a feature selected from the group consisting of:
the splitting the mobile phase output and the reducing pressure of the split flow stream are done without diluting the split flow stream, wherein the undiluted, volumetrically expanded split flow stream is directed to the shuttle valve;
the splitter tee is the only splitter tee between the separation device and the low pressure detector; and
both of the foregoing.

20. The method of claim 13, comprising operating a shuttle valve to perform the inserting volumetric aliquots of the volumetrically expanded split flow stream into the dilution flow stream, and the directing the diluted split flow stream to the low pressure detector.

* * * * *